(12) United States Patent
Silverman et al.

(10) Patent No.: US 9,541,946 B2
(45) Date of Patent: Jan. 10, 2017

(54) QUANTUM CLOCKS FOR A MASTER/SLAVE CLOCK ARCHITECTURE

(71) Applicant: Raytheon Company, Waltham, MA (US)

(72) Inventors: Steven J. Silverman, Irvine, CA (US); Nils Paz, La Mesa, CA (US); John R. Harmon, Encinitas, CA (US)

(73) Assignee: Raytheon Company, Waltham, MA (US)

( * ) Notice: Subject to any disclaimer, the term of this patent is extended or adjusted under 35 U.S.C. 154(b) by 193 days.

(21) Appl. No.: 14/073,298

(22) Filed: Nov. 6, 2013

(65) Prior Publication Data

US 2015/0123720 A1  May 7, 2015

(51) Int. Cl.
  *G06F 1/12* (2006.01)
  *G06F 1/10* (2006.01)

(52) U.S. Cl.
  CPC ............... *G06F 1/105* (2013.01); *G06F 1/12* (2013.01)

(58) Field of Classification Search
  CPC ........ H04L 7/0075; H04L 7/0008; G06F 1/12; G06F 1/105
  See application file for complete search history.

(56) References Cited

U.S. PATENT DOCUMENTS

| | | | |
|---|---|---|---|
| 7,286,444 B1 * | 10/2007 | Bahder | ............... G04G 7/02 250/336.1 |
| 7,359,064 B1 | 4/2008 | Bahder | |
| 7,451,292 B2 | 11/2008 | Routt | |
| 8,247,760 B2 | 8/2012 | David et al. | |
| 2006/0152719 A1 | 7/2006 | Iuliano | |
| 2006/0249670 A1 | 11/2006 | Monroe et al. | |
| 2009/0194702 A1 * | 8/2009 | Meyers et al. ............... 250/393 | |
| 2010/0085678 A1 | 4/2010 | Jefferson et al. | |
| 2014/0270802 A1 | 9/2014 | Silverman et al. | |

FOREIGN PATENT DOCUMENTS

| | | |
|---|---|---|
| EP | 2064587 A2 | 6/2009 |
| WO | WO-2008/039261 A2 | 4/2008 |

* cited by examiner

*Primary Examiner* — David Porta
*Assistant Examiner* — Faye Boosalis
(74) *Attorney, Agent, or Firm* — Schwegman Lundberg & Woessner, P.A.

(57) ABSTRACT

Embodiments of quantum clocks for a master/slave architecture are generally described herein. In some embodiments, a coupled pair of entangled particles is generated using a particle source. A first of the entangled particles of the coupled pair is used as a master clock. A second of the entangled particles of the coupled pair is used as a slave clock. Quantum states of the first entangled particle of the coupled pair associated with the master clock and the second of the entangled particles of the coupled pair associated with the slave clock are entangled by an Einstein-Podolsky-Rosen (EPR) link.

23 Claims, 9 Drawing Sheets

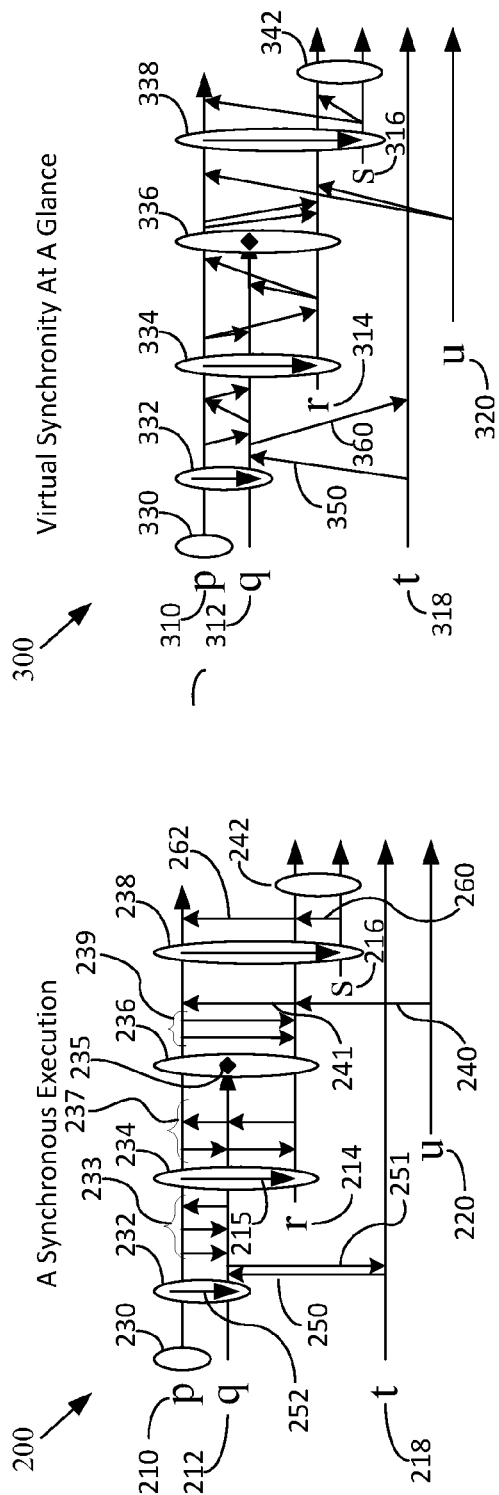
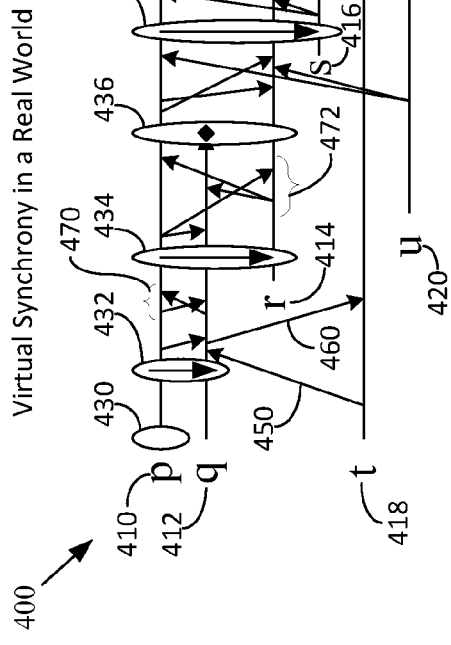

though in the claims encompass available equivalents of those claims.

QUANTUM CLOCKS FOR A MASTER/SLAVE CLOCK ARCHITECTURE

BACKGROUND

Systems On a Chip (SOCs) have extreme, complex clocking structures such that signals dovetail on time reliably. Multiple nodes coordinate their activity and the coordination of clocking for all of the nodes is a problem. Processors have increased in speed and have diminished in size thereby leading to the use of more processors and consequently an increase in the number of clocks. However, clocks vary in precision due to due to heat, oscillator capabilities, etc. These and other factors result in clock drift. Clocks may also vary as a result of internal bias, i.e., clock skew. Furthermore, the Time of Flight (ToF) from node to node is approximately one foot per nanosecond. Due to ToF restrictions alone may affect clock signals ability to traverse dies of certain geometries at particular frequency ranges. However, service requirements depend upon accuracy of timing, e.g., timeliness of responses, resilience to faults, etc.

The dependency on multiple clocks causes more heat, and leads to increased entropy. more network communication infrastructure and more wiring, as well as additional routing resources for worst case conditions. The dependency on multiple clocks also may cause increased cost for production, cooling and software. Processing for clock synchronization may be account for 20% to 30% of total processing.

Distributed processing has been used to increase computer processing. However, increasing the density of the processing on the chip still cannot resolve timing and synchronization issues. Synchronizing clocks on all nodes on a SOC is difficult to achieve due the challenge of aligning thousands of clock signals, hence less than optimal bandwidth is provided as one third or more of computational resources are used to manage synchronicity. Calculations have been used to attempt to align clock skews and clock drift, the time of flight, clock drift and skew and placing these timing signals within an acceptable error range such that data and processor loads finish within an acceptable range. In addition, synchronization messages have been broadcast to determine an approximate a master clock.

To establish and maintain a common time base, a synchronization primitive has also been tried. However, padding and worst case clock error constraint incur a performance hit. Further, the problems encountered are further compounded as more clocks and more loads are added to the system, whereby a solution uses either more hardware or more software (usually both). Clock error scaling presents a problem due to the number of nodes, the physical distance, and the use of inhomogeneous device types and communication channels.

BRIEF DESCRIPTION OF THE DRAWINGS

FIG. 2 illustrates a synchronous execution of processes according to an embodiment;

FIG. 3 illustrates virtual synchrony according to an embodiment;

FIG. 4 illustrates a real world example of virtual synchrony according to an embodiment;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Embodiments provide synchronization of distributed systems using quantum entanglement. In classical Newtonian physics, two objects communicate by sending/receiving wave/particles across both space/time. In quantum physics, entangled wave/particles share state information across space/time without sending/receiving wave/particles because the attributes, e.g., state information, of one entangled wave/particle are the same attributes, e.g., state information, of the other wave/particle across space/time. It is as if the particle exisists (or particles) exisit fully distributed across same and time An embodiment uses entanglement to provide a single master quantum clock in order to synchronize all clock skews and drifts system wide.

Using quantum entanglement as the basis of a master clock architecture provides fully synchronous activity of the various nodes, consistent and reliable heartbeats using a simple heartbeat count, reduces complexity in hardware and software, i.e., decreased entropy, reduces heat, i.e., decreased entropy, reduces cost and increases computational bandwidth for all nodes.

Figure 1:
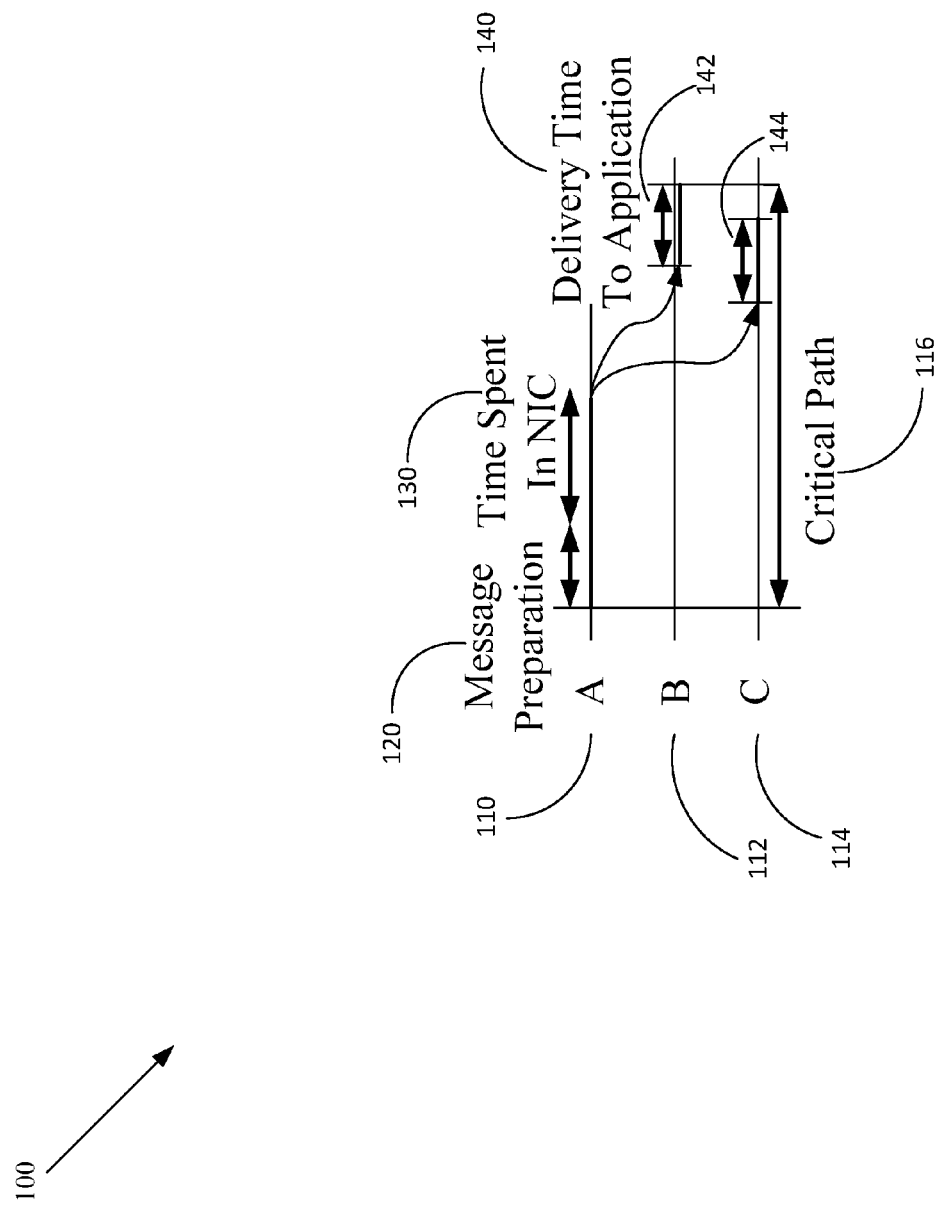
FIG. 1 is a graph showing a path used for determining network delays according to an embodiment.

FIG. 1 is a graph 100 showing a path used for determining network delays according to an embodiment. FIG. 1 shows three processors, A 110, B 112 and C 114. For clock synchronization associated with distributed computing, e.g., clock synchronization in wireless networks, the path 116 includes time for message preparation 120, time spent in the (NIC) 130 and delivery time to the application 140. As shown in FIG. 1 the delivery time to the application 142 for processor B 112 is determinate of the path 116 because the delivery time to the application 142 for processor B 112 is later than the delivery time to the application 144 for processor C 114. In a distributed system, it is impossible in practice to synchronize time across processes within the system. Therefore, a logical clock according to an embodiment is used based on the events through which the processes communicate.

FIG. 2 illustrates a synchronous execution of processes 200 according to an embodiment. In FIG. 2, a set of processes, i.e., processes p 210, q 212, r 214, s 216, t 218 and u 220 are shown executing as time elapses. The processes interact by exchanging messages, which are shown as arrows from process to process, e.g., processes 250. In FIG. 2, the message-passing arrows are vertical, as if the sending of a message was an instantaneous event. Thus, with true synchrony, executions run in genuine lock-step.

At the start, p 210 creates a process group 230 and is its only member. Then q 212 joins 232 and with help from p 210 initializes itself. In FIG. 2, arrow 252 denotes the creation of a checkpoint by p 210, which is copied to q 212, and then loaded by q 212. Then, t 218, a non-member, asks the group a question as represented by the upward arrow 250. Process t 218 sends a message 250, and the group members, p 210 and q 212, cooperate to respond as represented by downward arrow 251. Process p 210 and q 212 exchange update messages 233, e.g., multicasts. Next, process r 214 joins the group 234. Arrow 215 denotes the creation of a checkpoint by p 210, which is copied to r 214, and then loaded by r 214. Event 236 shows that process q 212 has crashed or failed 235. Notice that each event is seen in the identical order by all the members, e.g., using the counting mechanism referred to above, which in an entangled world provides global meaning. Process p 210 and process r 214 exchange update messages 237. After process q 212 crashes 235, process p 210 sends process r 214 additional update messages 239. Finally, FIG. 2 shows process s 216 joining the group 238 and process u 220 sends a message 240 to process r 214, wherein process 4r 214 sends a message 241 to process p 210. Process s 216 sends a message 260 to process r 214, which then sends a message 262 to process p 210. Even 242 terminates the execution.

FIG. 3 illustrates virtual synchrony 300 according to an embodiment. In FIG. 3, a set of processes, i.e., processes p 310, q 312, r 314, s 316, t 318 and u 320 are shown executing as time elapses. Process groups 330, 332, 334, 336, 338 and 342 are the same as shown in FIG. 2. In FIG. 3, the arrows, e.g., arrows 350, 360, are not vertical, but slant forward in time therefore indicating that the sending of a message takes time. With virtual synchrony, executions only look lock-step to the application, i.e., the synchronous event ordering is actually an illusion. For example, when the timing in the system is not synchronized, messages may be delivered with some delays, which are represented by the slanted arrows, e.g., arrows 350, 360.

FIG. 4 illustrates a real world example of virtual synchrony 400 according to an embodiment. In FIG. 4, a set of processes, i.e., processes p 410, q 412, r 414, s 416, t 418 and u 420 are shown executing as time elapses. Process groups 430, 432, 434, 436, 438 and 442 are the same as shown in FIGS. 2-3. Again, at least some of the arrows, e.g., arrows 450, 460, slant forward in time to indicate message transmission takes time. However, in FIG. 4 some of the arrows that represent transmitted messages, cross one another, e.g., at arrows 470, 472 for example. Sometimes a system can deliver events out of order and yet the application might not notice. However, the ideal order is not achievable using classic event handlers. Moreover, significant overhead and complexity incurs penalties to performance. Accordingly, synchronization of distributed clocks may be achieved using quantum entanglement according to an embodiment. Using quantum entanglement for synchronization of clocks provides a basis for a master clock architecture.

Figure 5:
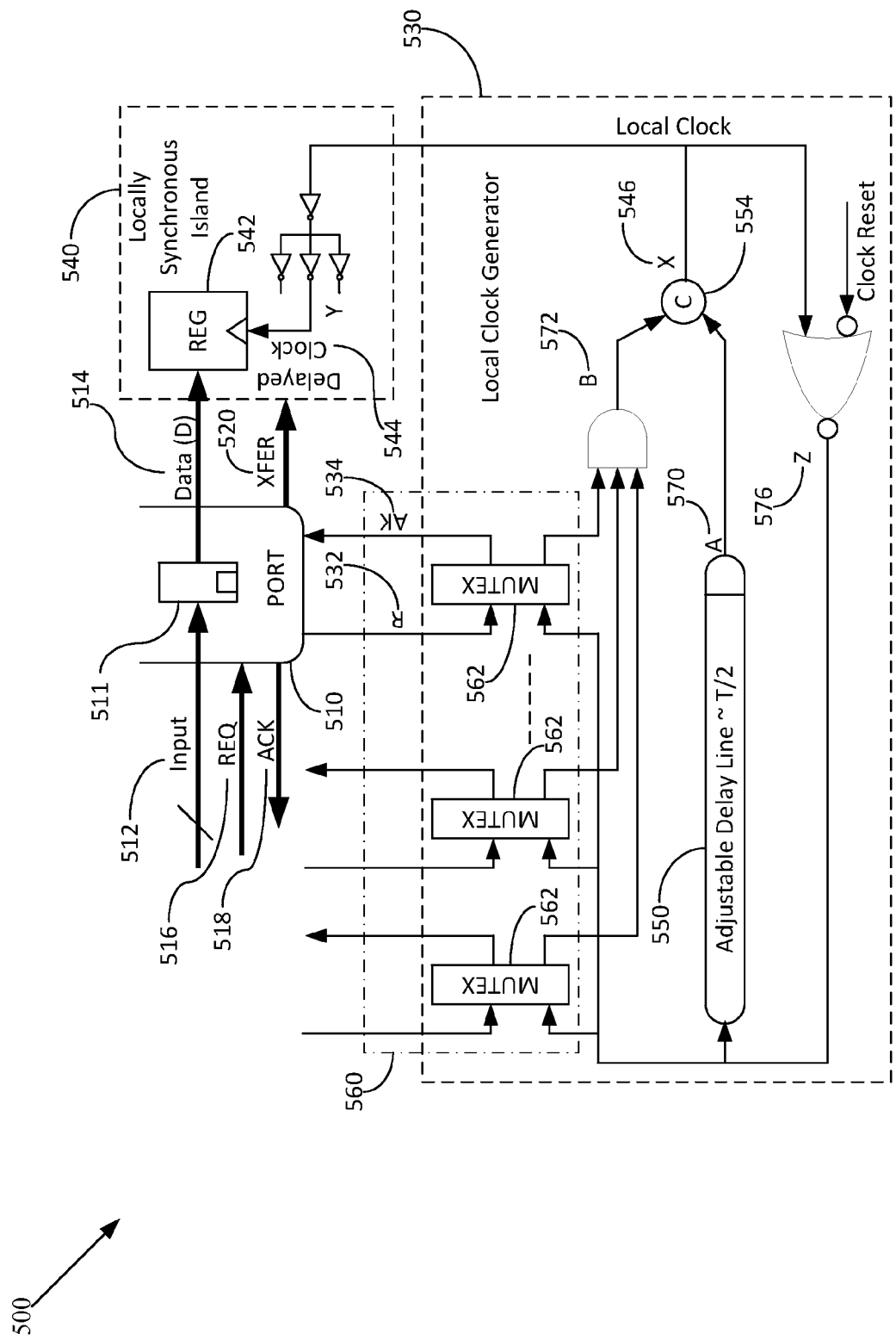
FIG. 5 illustrates a SOC implemented with a synchronization design according to an embodiment.

FIG. 5 illustrates a SOC implemented with a synchronization design 500 according to an embodiment. In FIG. 5, A port 510 is shown having input line 512, a data (D) signal 514, a request (REQ) line 516, an acknowledgement (ACK) line 518 and a transfer (XFER) line 520. A local clock generator 530 receives R signals 532 from the port 510 and provides an acknowledgement (AK) signal 534 to the port 510. A local synchronous island 540 includes a register 542. A delayed, local clock signal 544, from the local clock generator 530 is provided to the register 542, which receives the data 514 from the port 510.

In operation, clocking and input synchronization circuits are provided for locally-clocked SoC. A locally generated pausable clock, X 546 is employed in each locally synchronous island 540. Input and output to other islands are controlled through asynchronous handshake on designated ports. Data arrival is indicated by the REQ signal 516. In response, the port 510 produces signal R 532, asking the local clock generator 530 for a clock pause. Once the clock is paused, AK 534 is asserted, enabling data latching by the port latch 511. After the input data 512 is latched, the port 510 de-asserts R 532, enabling the local clock 546 to be provided to the locally synchronous island 540, in general, and as a delayed clock 544 to the register (REG) 542 in particular. Since the data (D) 514 is stable by that time, it is assured that REG 542 samples D 514 correctly. At this point, ACK 518 can be asserted, releasing the input handshake (REQ 516, ACK 518). Alternatively, ACK 518 can be asserted right after data latching.

The local clock generator 530 includes an adjustable delay line 550, not-OR (NOR) gate 552 C-element 554, and an arbitration circuit 560. The arbitration circuit 560 employs mutual exclusion elements (MUTEX) 562. The MUTEX elements 562 provide that even if multiple requests, R 532, arrive simultaneously, only one of them is granted. This is achieved by means of a metastability filter appended to a latch (not shown) in the MUTEX 562. Five different signals related to the clock are shown in FIG. 5: A 570, B 572, X 546, Y 544 and Z 576. Each incoming request signal (REQ) 516 is presented to the MUTEX element 562 by R 532, asking for a clock pause. The MUTEX element 562 decides whether to grant the request, i.e., AK 534, or to allow the next clock pulse. The next clock pulse will take place only if all MUTEX elements allow it, i.e. node B 572 goes high. If the rising and falling transitions of a node n by n+ and n−, respectively, the C-element 554 allows for the local clock signal, X 546, to be stretched (X+ transition is blocked) whenever any of the incoming R requests 532 is granted, i.e., B 572 is low, when A 570 is rising. X+ will remain blocked until all granted R requests 532 are released, and B 572 eventually goes high.

Figure 6:
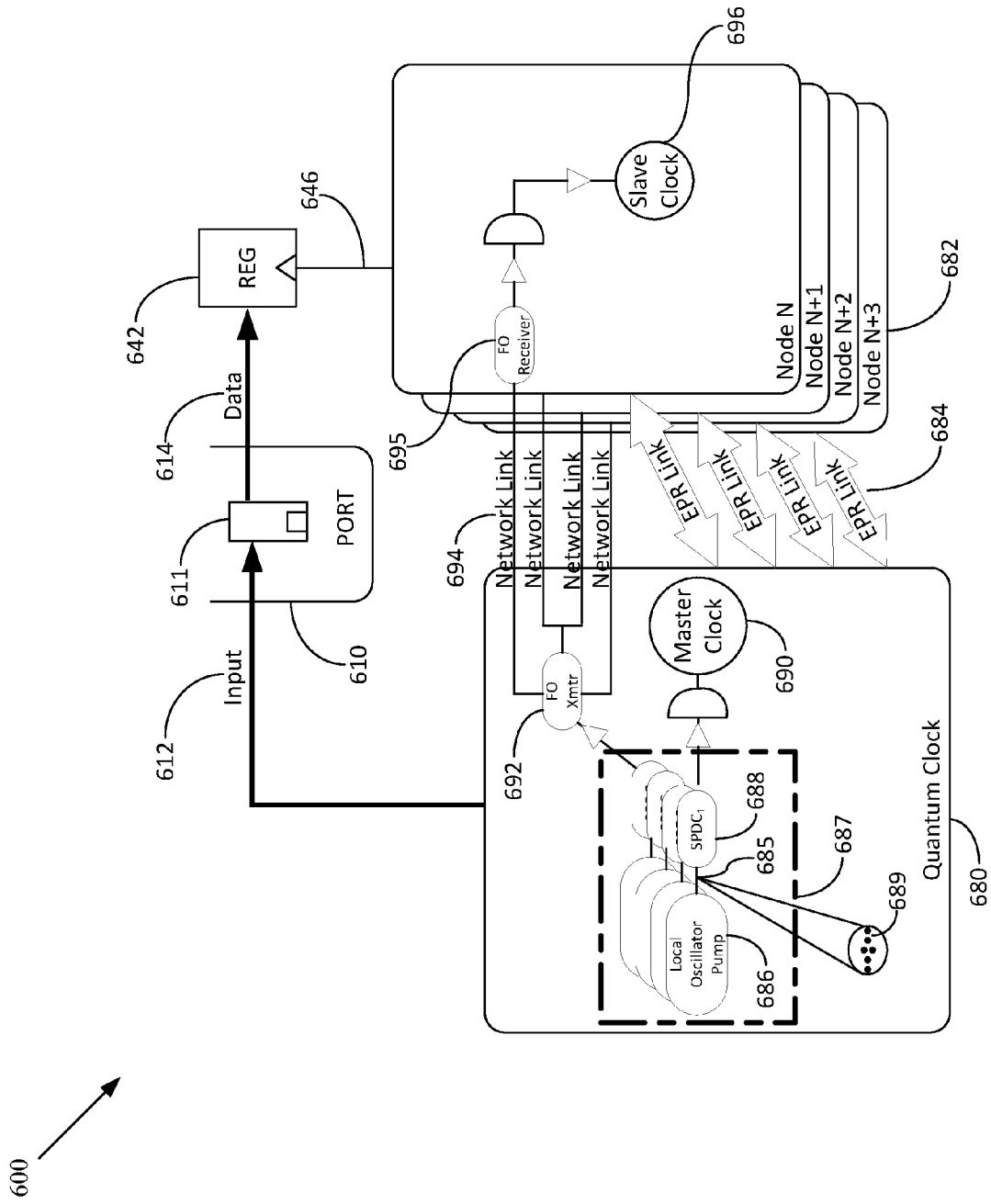
FIG. 6 illustrates quantum clock synchronization for a SOC according to an embodiment.

FIG. 6 illustrates quantum clock synchronization for a SOC 600 according to an embodiment. In FIG. 6, a port 610 receives input 612 from a quantum clock 680. Data 614 is provided by the port 610 to a register 642. Port 610 includes port latch 611 which is enabled to provide data 614 to register 642. A plurality of nodes 682 is provided. The nodes may include reusable components, e.g., intellectual property (IP) blocks or cores, which are configurable, or programmable, for use in a wide range of applications.

Entanglement involves the interactions between quantum bodies or particles. As shown in FIG. 6, the plurality of nodes 682 are entangled with the quantum clock 680 via Einstein-Podolsky-Rosen (EPR) links 684. A photon encoded with polarization or phase information can be "entangled" with another photon encoded the same way. Even after separating the two photons by a long distance, detecting the state of one of the photons determines the state of the other. An entangled quantum body/particle source 687 may be used to generate entangled photon pairs. The entangled particle source 687 may include at least one laser oscillator (LO) pump 686 provides a laser beam that is processed through corresponding spontaneous parametric down conversion (SPDC) 688. However, those skilled in the art will recognize that embodiments described herein are not meant to be limited to an LO pump 686 and SPDC 688. Other sources of entangled particles may be used according to other embodiments.

SPDC 688 receives a pump laser beam 685 having photons 689 from LO pump 686 through a nonlinear material, such as a non-linear crystal. Occasionally, the nonlinear interaction inside the crystal leads to the annihilation of a high frequency pump photon and the creation of two lower frequency photons, e.g., a signal and idler photon. Thus, SPDC 686 generates quantum correlated photon pairs. SPDC 686 is stimulated by random vacuum fluctuations that create the photon pairs.

A quantum master/slave clock architecture, as shown by quantum clock 680 and nodes 682, is based on the entanglement of the photon pair. Thus, one of the photons is used as a master clock 690. The other is provided to a fiber optic (FO) transmitter 692. Network links 694 coupled the FO transmitter 692 to FO receivers 695 at the nodes 682 via network links 694. The photons received at the FO receivers 695 at each node 682 are used to provide a slave clock 696 that is used to provide a local clock signal 646 to register 642.

Figure 7:
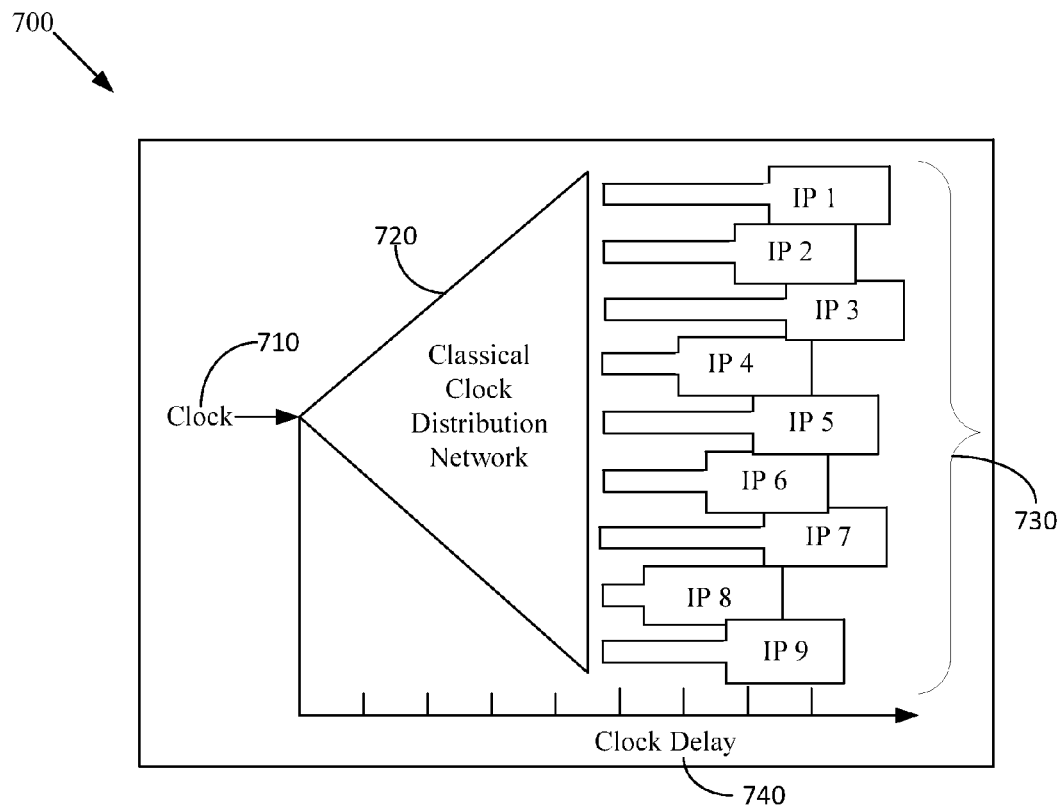
FIG. 7 illustrates distribution and misalignment of cores for classical clock distribution network according to an embodiment.

FIG. 7 illustrates distribution and misalignment of cores for classical clock distribution network 700 according to an embodiment. In FIG. 7 a clock 710 is provided to a quantum clock distribution network 720. Nine IP cores 730 are shown in FIG. 7. Each of the nine IP cores 730 may be compared to a clock delay scale 740 to identify each clock delay. In FIG. 7, the nine IP cores 730 exhibit various clock delays.

Figure 8:
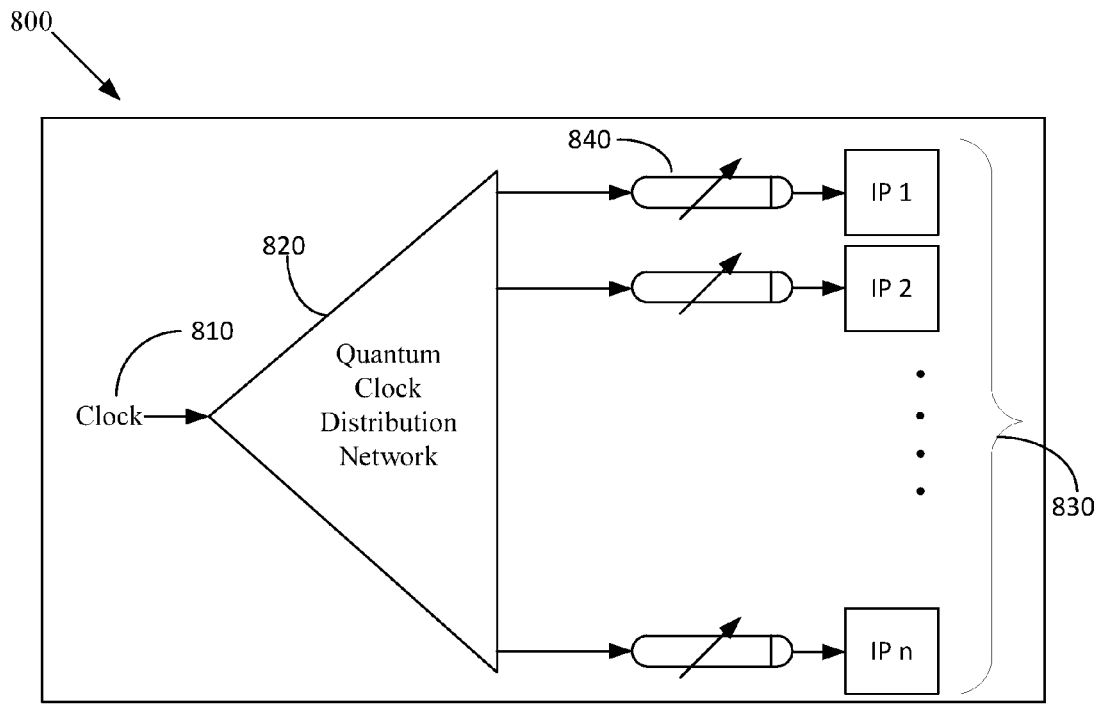
FIG. 8 illustrates distribution and alignment of cores for quantum clocks according to an embodiment.

FIG. 8 illustrates distribution and alignment of cores for quantum clocks 800 according to an embodiment. In FIG. 8 a clock 810 is provided to a quantum clock distribution network 820. Because the quantum clocks 840 are provided by EPR links, timing is aligned for the n IP cores 830. Thus, in FIG. 8, the n IP cores 830 are shown in alignment.

Figure 9:
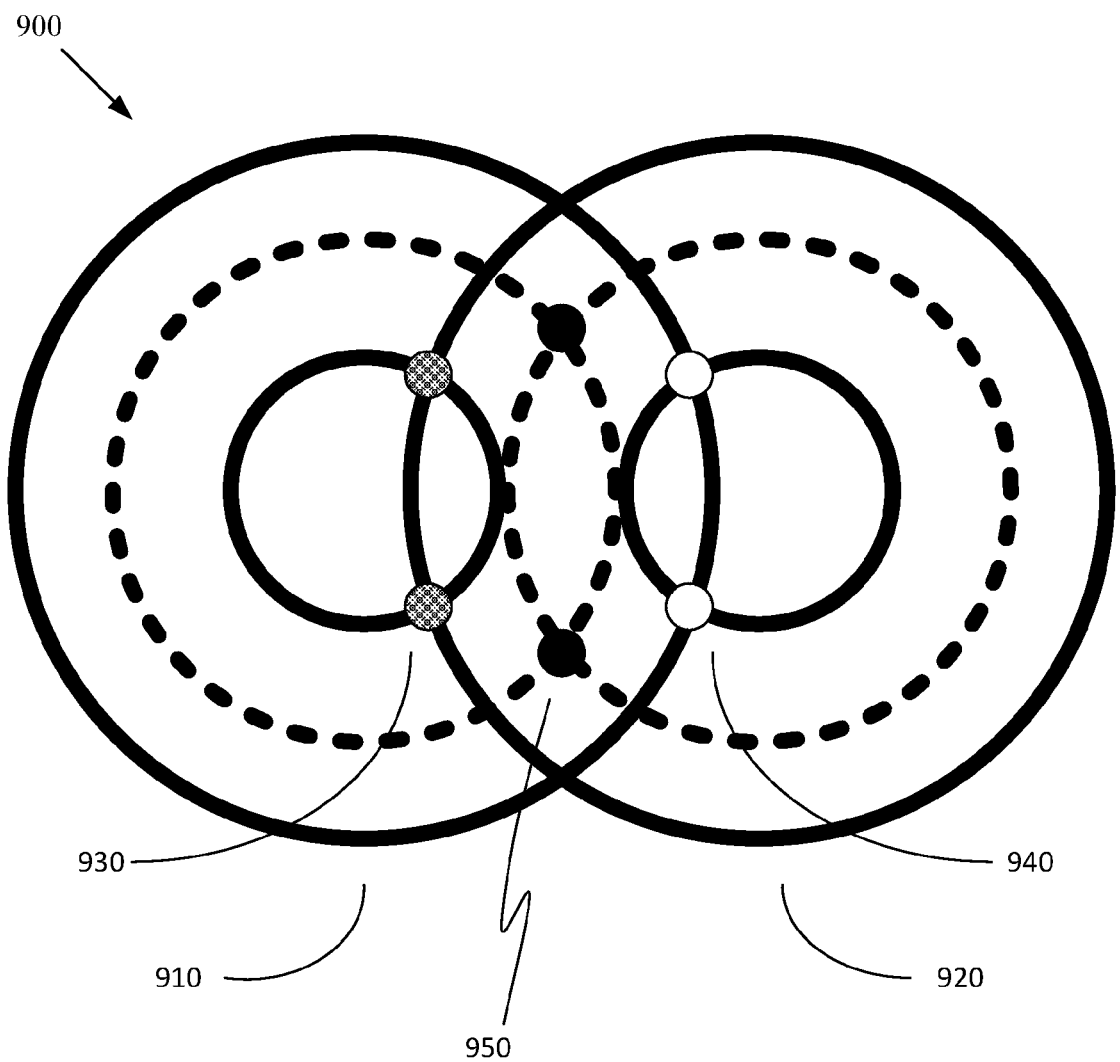
FIG. 9 shows entangled photons for quantum clocks according to an embodiment.

FIG. 9 shows entangled photons for quantum clocks 900 according to an embodiment. In FIG. 9, the two photons 910, 920 are shown entangled. Photon pairs 910, 920 from spontaneous parametric down-conversion are emitted in directions determined by the phase-matching conditions and energy conservation in a crystal in a SPDC. The photon pairs 910, 920 having the same wavelength exhibit polarization-entangled photon states. In FIG. 9, photon pairs 910, 920 are entangled at points 930, 940, 950. One master clock may be provided by photon pairs 910, 920. All structures recognize the signal heartbeat of the system. Thus, communication via messaging, semaphores or bandpass filers becomes unnecessary.

The basis for using photon pairs as quantum clocks involves the Einstein, Podolsky, Rosen (EPR) paradox. The EPR paradox involves a property of the quantum mechanical state of a system containing two or more sub atomic objects. The objects are linked in a way such that the attributes of one object highly correlate with attributes of the other. Further, the entanglement is independent of space or time.

Figure 10A:
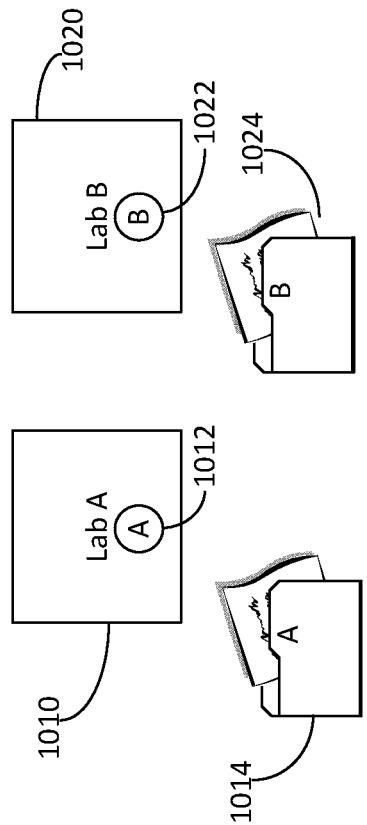
FIGS. 10a-b illustrate verification of correlation between photon pairs or other quantum particles according to an embodiment.
Figure 10B:
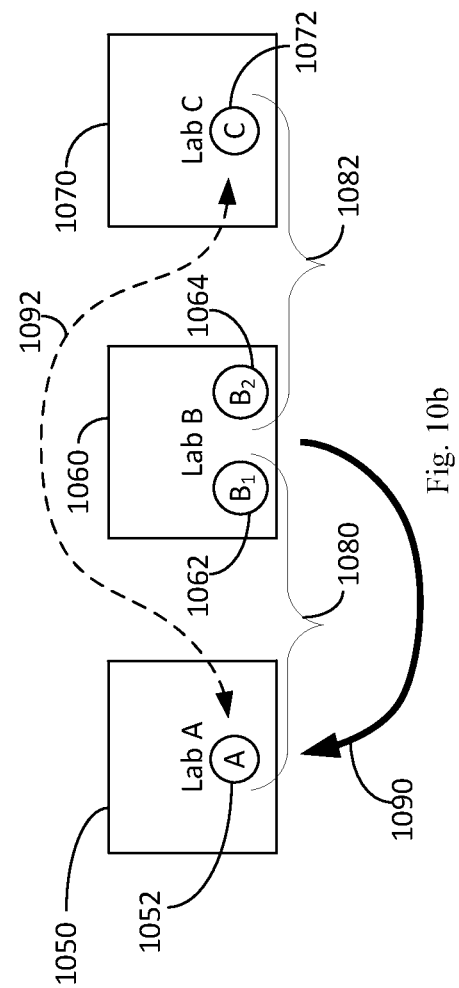

FIGS. 10a-b illustrate verification of correlation between photon pairs or other quantum particles according to an embodiment. For example, in FIG. 10a, Lab A 1010 and Lab B 1020 entangle two photons and Lab A 1010 performs independent measurements of photon A 1012. Lab B 1020 does likewise with photon B 1022. Lab A 1010 measures random fluctuations of the intrinsic properties of photon A 1012 and Lab B 1020 measures the same properties of photon B 1022. When both labs 1010, 1020 compare notes 1014, 1024, respectively, the states of photon A 1012 and photon B 1022 are noted as 100% correlated or 100% inversely correlated. Moreover, Lab A 1010 and Lab B 1020 can be an extraordinary distance apart and the results are the same.

Nitrogen vacancy centers have recently become leading candidates for a number of applications such as quantum computers, quantum cryptography and communication, magnetic sensors, and spin-photon entanglement. At low temperature, the optical transitions of the nitrogen vacancy center become very narrow and can be coherently manipulated. This can be used to explore interesting applications such as spin-photon entanglement generation.

Moreover, entanglement itself can be teleported if the state to be teleported is part of an entangled state. This process, called entanglement swapping, allows quantum teleportation channels to be concatenated, e.g., two particles or other quantum bodies may become entangled that have never directly interacted. Hence, two particles with no common past can act as a single object.

For example, FIG. 10b illustrates entanglement swapping may occur with quantum systems that have never interacted. In FIG. 10b, there are three labs: Lab A 1050, Lab B 1060 and Lab C 1070. Lab A 1050 has particle A 1052, Lab B 1060 has particles B1 1062 and B2 1064, and Lab C 1070 has particle C 1072. Particles A 1052 and B1 1062 are initially entangled 1080 and Particles B2 1064 and C 1072 are initially entangled 1082. Lab B 1060 performs measurement on both B particles, B1 1062, B2 1064 and communicates results 1090 to Lab A 1050. At LAB A, particles A 1052 is now entangled 1092 with particle C 1072, wherein particle A 1052 and particle C 1072 have never before interacted.

Accordingly, quantum entanglement may be used to provide a master clock architecture and the entanglement between a first pair of entangled quantum bodies may be transferred to a quantum body that has never before interacted with the first pair of entangled quantum bodies. A master clock architecture has the advantages of providing fully synchronous activity of the various nodes, provides consistent and reliable heartbeat using a simple heartbeat count, reduces complexity in hardware and software, reduces heat, reduces cost and provides increased computational bandwidth for all nodes.

Figure 11:
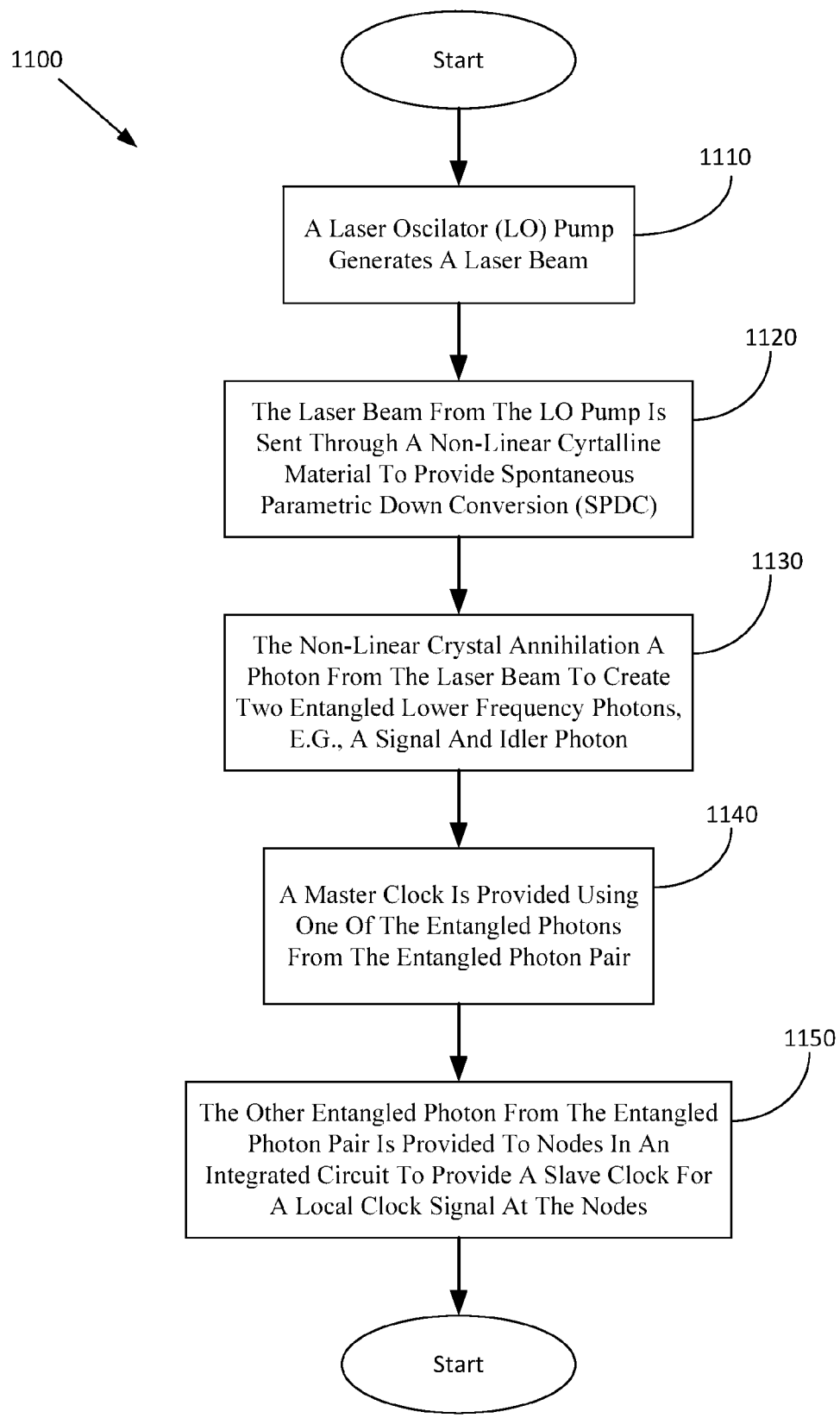
FIG. 11 is a flow chart for using quantum clocks for a master/slave architecture according to an embodiment.

FIG. 11 is a flow chart 1100 for using quantum clocks for a master/slave architecture according to an embodiment. In FIG. 11, a laser oscillator (LO) pump generates a laser beam 1110. The laser beam from the LO pump is sent through a non-linear crystalline material to provide spontaneous parametric down conversion (SPDC) 1120. The non-linear crystal annihilation a photon from the laser beam to create two entangled lower frequency photons, e.g., a signal and idler photon 1130. A master clock is provided using one of the entangled photons from the entangled photon pair 1140. The other entangled photon from the entangled photon pair is provided to nodes in an integrated circuit to provide a slave clock for a local clock signal at the nodes 1150. The photon for the master clock and the photon for the slave clock are entangled via an EPR link.

Figure 12:
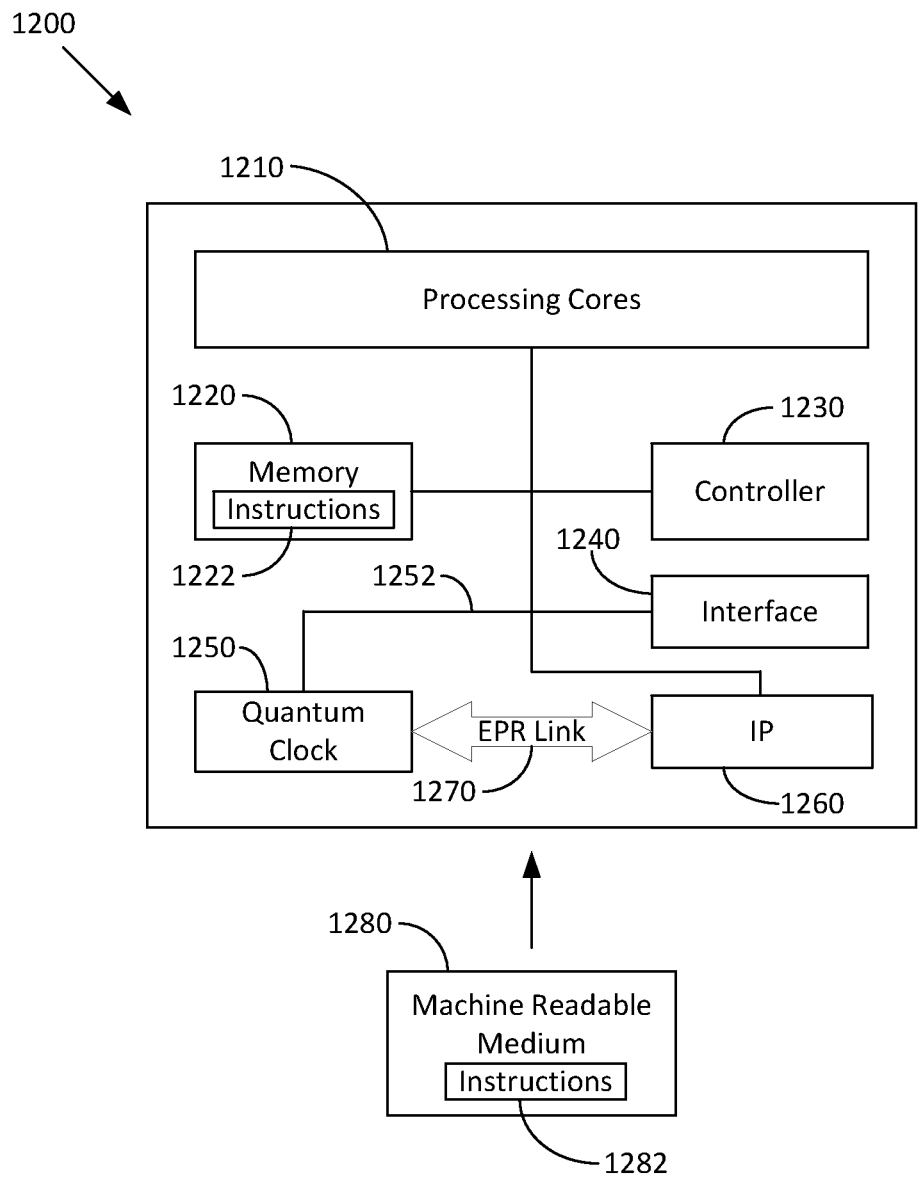
FIG. 12 illustrates a block diagram of an example machine for providing quantum clocks for a master/slave clock according to an embodiment

FIG. 12 illustrates a block diagram of an example machine 1200 for providing quantum clocks for a master/slave clock according to an embodiment upon which any one or more of the techniques (e.g., methodologies) discussed herein may perform. In alternative embodiments, the machine 1200 may operate as a standalone device or may be connected (e.g., networked) to other machines. The machine 1000 may be any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1200 may include a hardware processor 1210 (e.g., a central processing unit (CPU), a graphics processing unit (GPU), a hardware processor core, or any combination thereof), memory 1220, which may include a selection of read-only memory (ROM), random-access memory (RAM), electrical erasable programmable read-only memory (EEPROM) and flash memory. The machine 1200 may further include an interface 1240 for coupling to other devices, processors, memory, nodes, etc., and may include interfaces based industry standards such as Universal Serial Bus (USB), FireWire, Ethernet, Universal Synchronous/Asynchronous Receiver/Transmitter (USART), Serial Peripheral Interface (SPI). The machine 1200 may include a controller 1230 which may provide input/output logic control as well as control for functionality of the other blocks. A quantum clock 1250 is used to provide timing sources for different nodes/IP cores 1260 based on the quantum master/slave architecture described herein based on EPR links 1270. A bus 1252 is provided for signaling between blocks/nodes of the machine 1200. However, the clocking between blocks/nodes is provided via EPR links.

At least one machine readable medium 1280 may be used to store one or more sets of data structures or instructions 1282 (e.g., software) embodying or utilized by any one or more of the techniques or functions described herein. The instructions 1222 may also reside, at least partially, additional machine readable memories such as memory 1220, or within the processor 1210 during execution thereof by the machine 1200. In an example, one or any combination of the hardware processor 1210, the memory 1220, etc. may constitute machine readable media. While the machine readable medium 1280 is illustrated as a single medium, the term "machine readable medium" may include a single medium or multiple media (e.g., a centralized or distributed database, and/or associated caches and servers) that configured to store the one or more instructions 1282.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact disk read-only memory (CD-ROM) disks and digital video disk read-only memory (DVD-ROM) disks. The instructions 1282, 1220 may further be transmitted or received over bus 1252 utilizing any one of a number of transfer protocols (e.g., frame relay, internet protocol (IP), transmission control protocol (TCP), user datagram protocol (UDP), hypertext transfer protocol (HTTP), etc.).

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for providing quantum clocks, comprising:
   generating a coupled pair of entangled particles using a particle source;
   using a first of the entangled particles of the coupled pair as a master clock, wherein the master clock comprises a locally generated pausable clock that, when paused, enables data latching by a port latch; and
   using a second of the entangled particles of the coupled pair as a slave clock; wherein quantum states of the first entangled particle of the coupled pair associated with the master clock and the second of the entangled particles of the coupled pair associated with the slave clock are entangled by an Einstein-Podolsky-Rosen (EPR) link.

2. The method of claim 1, wherein the generating the coupled pair of entangled particles comprises generating a coupled pair of entangled photons.

3. The method of claim 1, wherein the generating the coupled pair of entangled particles comprises:
   generating a laser beam having a stream of photons using a laser oscillator pump; and
   performing spontaneous parametric down conversion using the laser beam from the laser oscillator pump to couple pairs of entangled photons.

4. The method of claim 3, wherein the performing spontaneous parametric down conversion comprises passing the laser beam through a non-linear crystalline material to annihilate a photon from the laser beam to create the coupled pair of entangled photons.

5. The method of claim 1, wherein using the second of the entangled particles of the coupled pair as a slave clock comprises providing the second of the entangled particles to a receiver at a node and providing the second of the entangled particles to the slave clock via a network link.

6. The method of claim 5, wherein the using the second of the entangled particles of the coupled pair as a slave clock comprises providing a local clock signal based on the slave clock.

7. The method of claim 1, wherein entanglement of the quantum states of the first and second entangled particles by via the Einstein-Podolsky-Rosen (EPR) link reduces system entropy by reducing clock skew and clock drift without local clocking.

8. A quantum clocking system, comprising:
   an entangled particle source arranged to generate a first coupled pair of entangled particles;
   a master clock arranged to provide a master clock using a first of the entangled particles of the first coupled pair, wherein the master clock comprises a locally generated pausable clock that, when paused, enables data latching by a port latch; and
   a slave clock arranged to provide a slave clock using a second of the entangled particles of the first coupled pair; and
   an Einstein-Podolsky-Rosen (EPR) link for synchronizing the master clock and the slave clock via entanglement of quantum states of the first entangled particle of the first coupled pair associated with the master clock and the second of the entangled particles of the first coupled pair associated with the slave clock.

9. The quantum clocking system of claim 8, wherein the first coupled pair of entangled particles comprises a first coupled pair of entangled photons.

10. The quantum clocking system of claim 8, wherein the entangled particle source further comprises:
    a laser oscillator pump arranged to generate a laser beam having a stream of photons; and
    a spontaneous parametric down converter arranged to convert photons of the laser beam from the laser oscillator pump to a first coupled pair of entangled photons.

11. The quantum clocking system of claim 10, wherein the spontaneous parametric down converter further comprises a non-linear crystalline material for annihilating photons from the laser beam to create the first coupled pair of entangled photons.

12. The quantum clocking system of claim 8, further comprising a transmitter arranged to transmit the second of the entangled particles of the first coupled pair to a receiver at a node via a network link.

13. The quantum clocking system of claim 12, wherein the second of the entangled particles of the first coupled pair provides a local clock signal synchronized with the master clock via the EPR link.

14. The quantum clocking system of claim 8, wherein the entangled particle source is arranged to generate a second coupled pair of entangled particles, wherein the entanglement of one of the first coupled pair of entangled particles is teleported to one of the second coupled pair of entangled particles.

15. The quantum clocking system of claim 8, wherein the Einstein-Podolsky-Rosen (EPR) link entangling the quantum states of the first and second entangled particles reduces system entropy by reducing clock skew and clock drift without local clocking.

16. A system on a chip, comprising:
    a quantum clock module arranged to provide a master clock, the quantum clock further comprising a local oscillator pump laser for generating a laser beam having a plurality of photons, a spontaneous parametric down converter, the laser beam being passed through the spontaneous parametric down converter to produce a coupled pair of entangled photons, wherein the master clock is provided using a first of the coupled pair of entangled photons, wherein the master clock comprises a locally generated pausable clock that, when paused, enables data latching by a port latch;

at least one node arranged to provide a first functionality, the at least one node implemented using at least one slave clock, the at least one slave clock implemented using a second of the coupled pair of entangled photons; and an Einstein-Podolsky-Rosen (EPR) link for synchronizing the master clock and the at least one slave clock via entanglement of quantum states of the first of the coupled pair of entangled photons associated with the master clock and the second of the entangled photons associated with the at least one slave clock.

17. The system on a chip of claim 16, wherein the spontaneous parametric down converter further comprises a non-linear crystalline material for annihilating photons from the laser beam to create the first of the coupled pair of entangled photons.

18. The system on a chip of claim 16, further comprising a transmitter arranged to transmit the second of the entangled photons of the first coupled pair to a receiver at the at least one node via at least one network link.

19. The system on a chip of claim 16, wherein the second of the entangled photons of the first coupled pair provides a local clock signal synchronized with the master clock via the ERP link.

20. The system on a chip of claim 16, wherein the Einstein-Podolsky-Rosen (EPR) link entangling the quantum states of the first and second of the entangled photons reduces system entropy by reducing clock skew and clock drift without local clocking.

21. The system on a chip of claim 16 further comprising a port arranged to receive input and to provide data to a register.

22. The system on a chip of claim 21, wherein the at least one slave clock is used to provide a local clock to the register.

23. The system on a chip of claim 22, wherein the at least one slave clock is used to provide a sampling clock to the register for sampling the data.

* * * * *

UNITED STATES PATENT AND TRADEMARK OFFICE
CERTIFICATE OF CORRECTION

PATENT NO. : 9,541,946 B2  Page 1 of 1
APPLICATION NO. : 14/073298
DATED : January 10, 2017
INVENTOR(S) : Silverman et al.

It is certified that error appears in the above-identified patent and that said Letters Patent is hereby corrected as shown below:

In the Specification

In Column 1, Line 23, delete "more" and insert --More-- therefor

In Column 2, Line 36, delete "exisits (or particles) exisit" and insert --(or particles) exists-- therefor In Column 2, Line 37, delete "same and time" and insert --space and time.-- therefor In Column 3, Line 26, delete "4r" and insert --r-- therefor In Column 4, Line 6, delete "SoC." and insert --SOC.-- therefor In Column 5, Line 11, delete "686" and insert --688-- therefor In Column 5, Line 12, delete "686" and insert --688-- therefor In Column 5, Line 26, delete "quantum" and insert --classical-- therefor In Column 5, Line 51, delete "Einstein, Podolsky, Rosen (EPR)" and insert --Einstein-Podolsky-Rosen (EPR)-- therefor In Column 6, Line 65, delete "1000" and insert --1200-- therefor In Column 8, Line 36, delete "1220" and insert --1222-- therefor Signed and Sealed this
Tenth Day of July, 2018

Andrei Iancu
*Director of the United States Patent and Trademark Office*